United States Patent
Wörtche et al.

(10) Patent No.: US 9,891,343 B2
(45) Date of Patent: Feb. 13, 2018

(54) METHOD AND SYSTEM FOR MAPPING A THREE-DIMENSIONAL STRUCTURE USING MOTES

(71) Applicant: INGU Solutions Inc., Calgary (CA)

(72) Inventors: Heinrich Johannes Wörtche, Bedum (NL); Elena Talnishnikh, Amersfoort (NL)

(73) Assignee: INGU Solutions Inc., Calgary (CA)

( * ) Notice: Subject to any disclaimer, the term of this patent is extended or adjusted under 35 U.S.C. 154(b) by 383 days.

(21) Appl. No.: 14/641,277

(22) Filed: Mar. 6, 2015

(65) Prior Publication Data

US 2015/0268377 A1    Sep. 24, 2015

(30) Foreign Application Priority Data

Mar. 20, 2014    (NL) ..................... 2012483

(51) Int. Cl.
*G01V 9/00* (2006.01)
*E21B 47/00* (2012.01)
*E21B 47/10* (2012.01)

(52) U.S. Cl.
CPC ............ *G01V 9/00* (2013.01); *E21B 47/0003* (2013.01); *E21B 47/1015* (2013.01)

(58) Field of Classification Search
CPC ...................................................... G01V 9/00
USPC ............................................................ 702/6
See application file for complete search history.

(56) References Cited

U.S. PATENT DOCUMENTS 5,517,593 A * 5/1996 Nenniger ................ E21B 36/04
166/250.11

| | | |
|---|---|---|
| 2003/0056952 A1 | 3/2003 | Stegemeier et al. |
| 2007/0055447 A1 | 3/2007 | Mickaele et al. |
| 2007/0254381 A1* | 11/2007 | Jung .................... A61M 5/1452 436/514 |
| 2009/0211745 A1 | 8/2009 | Verret et al. |
| 2010/0139386 A1 | 6/2010 | Taylor |
| 2010/0242585 A1 | 9/2010 | Pratyush et al. |

(Continued)

FOREIGN PATENT DOCUMENTS

CA    2711397 A1 *    2/2011 ............. E21B 43/16

OTHER PUBLICATIONS

Search Report and Written Opinion of the Dutch Patent Application No. NL2012483 dated Dec. 8, 2014.

(Continued)

*Primary Examiner* — Igwe U Anya

(74) *Attorney, Agent, or Firm* — Bereskin & Parr LLP

(57) ABSTRACT

A method for mapping a three-dimensional structure and obtaining information on the condition of said structure. The method includes injecting a plurality of motes into the structure causing the plurality of motes to travel through the one or more channels, the motes including a sensor and a storage, the motes being arranged designed to obtain a sensor-value measured by the sensor and to store the sensor-value in the storage, thus obtaining a time series of measured sensor-values in the storage, retrieving at least part of the plurality of motes from the structure, obtaining from said retrieved motes the time series of measured sensor-values stored in the retrieved motes, thus obtaining a set of measured time series, determining the structure or the condition by comparing the set of measured time series with a simulation.

16 Claims, 8 Drawing Sheets

(56) References Cited

U.S. PATENT DOCUMENTS

| | | | | |
|---|---|---|---|---|
| 2010/0268470 | A1 | 10/2010 | Kamal et al. | |
| 2011/0085720 | A1* | 4/2011 | Averbuch | A61B 90/36 |
| | | | | 382/131 |
| 2011/0229071 | A1* | 9/2011 | Vincelette | E21B 43/2406 |
| | | | | 385/13 |
| 2015/0232942 | A1* | 8/2015 | Abate | C12Q 1/6886 |
| | | | | 506/9 |
| 2015/0268213 | A1* | 9/2015 | Wortche | G01N 33/1886 |
| | | | | 73/53.01 |

OTHER PUBLICATIONS

Dubbelman, G., Duisterwinkel, E., Demi, L., Talnishnikh, E., Wortche, H.J. & Bergmans, J.W.M. (2014). Robust sensor cloud localization from range measurements. Conference Paper : Proceedings of the IEEE/RSJ International Conference on Intelligent Robots and Systems (IROS), Sep. 14-18, 2014, Chicago, Illinois, (pp. 3820-3827).

Duisterwinkel, E., Demi, L., Dubbelman, G., Talnishnikh, E., Wörtche, H.J. & Bergmans, J.W.M. (2014). Environment mapping and localization with an uncontrolled swarm of ultrasound sensor motes. Conference Paper : Proceedings of the 166th Meeting of the Acoustical Society of America, Dec. 2-6, 2013, San Fransisco, California.

* cited by examiner

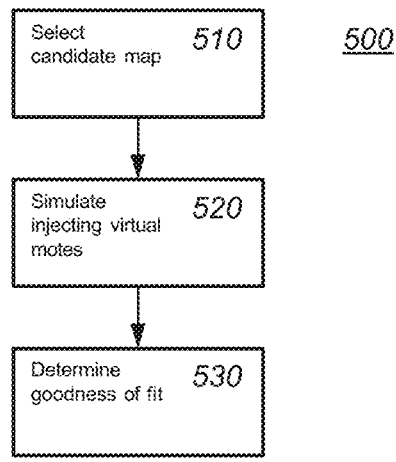
Fig. 5a
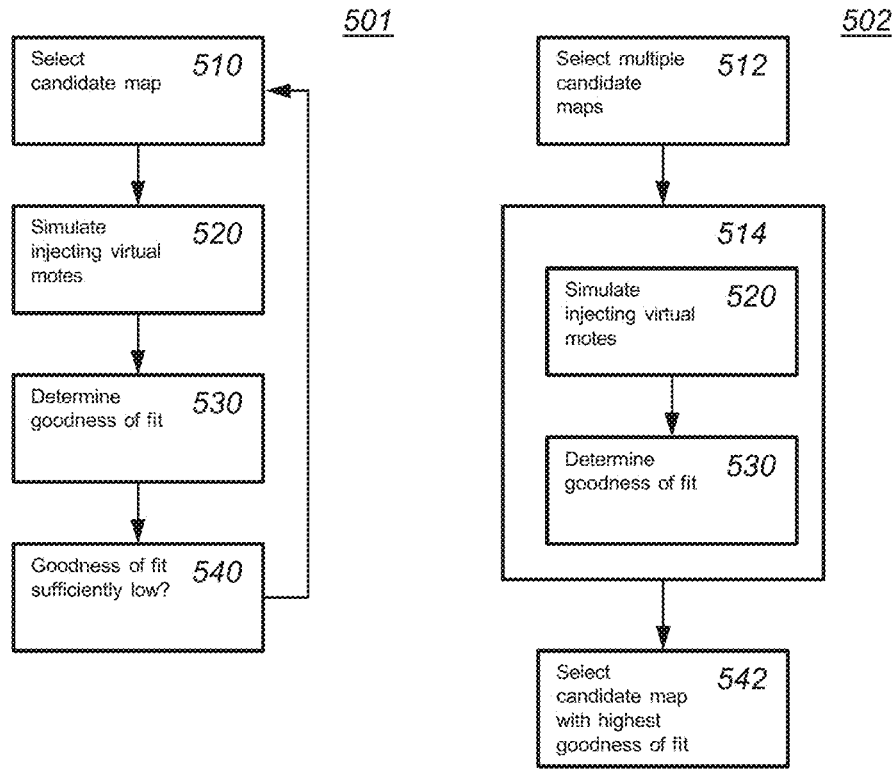
Fig. 5b
Fig. 5c

531

| 551 | Compare set of measured time series with simulation |

| 552 | Determine passage times measured time series |

↓

| 553 | Determine a measured passage-time distribution |

↓

| 554 | Obtaining simulated passage-time distribution |

↓

| 555 | Comparing the measured passage-time distribution with the simulated passage-time distribution. |

| 556 | Obtaining set of simulated time series of sensor values |

↓

| 570 | Compare set of measured with simulated time series |

| 581 | Assign simulated and measured time series to categories |

↓

| 582 | Determine simulated and measured category distribution |

↓

| 583 | Compare category distributions |

| 584 | Determine histogram for measured and simulated time series |

↓

| 585 | Determine simulated and measure histogram distribution |

↓

| 586 | Compare histogram distributions |

*Fig. 5h*

METHOD AND SYSTEM FOR MAPPING A THREE-DIMENSIONAL STRUCTURE USING MOTES

FIELD OF THE INVENTION

The invention relates to a method for mapping a three-dimensional structure.

The invention further relates to a mapping system and to a computer program for mapping a three-dimensional structure.

BACKGROUND

Recovering heavy crude oil from an oil-bearing formation is known to be difficult. One approach is the so-called 'Cold Heavy Oil Production with Sand' (CHOPS). In this technique oil is deliberately extracted together with sand. CHOPS is applied for example in unconsolidated sandstones. CHOPS requires a large sand influx which is maintained during the productive life of the well. After recovery the sand and oil are separated, e.g., by settling, and the sand is disposed of. Maintaining or re-initiating sand and fluid influx is one of the challenges of CHOPS.

CHOPS reservoirs have been found at depths ranging from about 350 to 900 m. The reservoir itself may have varying degree of thickness; Reservoirs are known with thickness ranging from 3 meter to 30 m.

After a new CHOPS well is started, the initial sand influx is large, but over a period the sand influx diminishes until a steady-state is obtained. At the same time, the oil recovery increases until a maximum is reached.

During the CHOPS process channels are formed in the reservoir. These channels are known as 'wormholes'. A wormhole may penetrate several feet into a formation. Although wormholes allow the oil to flow, they may form a connection between two wells. This negative aspect may cause water encroachment or pressure loss.

After a CHOPS well has reached its maximum, production slowly declines, until at some point the oil production becomes too low for commercial exploitation. At this point a so-called 'workover' may be attempted.

A workover may increase the oil-production back to higher levels, by re-initiating and maintaining the sand influx. Known workover strategies include using larger diameter perforations in the oil well, using a different spacing of the perforations, apply a different type of pumping, apply fill-in wells, etc.

It is known that diagnosing the reasons for reduced oil production in a CHOPS well is difficult due to the inaccessibility of the location. Diagnostic data is often incomplete, inaccurate, or contradictory.

Indeed, placement of in-fill wells may be counter-productive. For example, if an in-fill well intersects the wormhole network, then this may render the entire well non-productive due to loss of pressure and watering out.

SUMMARY OF THE INVENTION

It would be advantageous to have a method for mapping a three-dimensional structure, especially for inaccessible three-dimensional structures such as the wormhole network formed by a CHOPS well. The mapping may identify substructures of the three-dimensional structure, such as channels, in particular wormholes.

A method is proposed for mapping a three-dimensional structure comprising one or more channels; The method is defined in claim 1.

The method for mapping a three-dimensional structure may be applied to wormholes discussed above. This allows wormholes and wormhole networks to be better understood. Once better information is available concerning the mapping or layout of the worm holes, the operator of the well can make informed decisions regarding possible workovers (sometimes written as workover). For example, the location of in-fill well may be better selected. Furthermore, wormholes may even be used to increase production by using them to transport a solvent, e.g., steam or by collapsing the wormholes.

The method of mapping may thus be applied to mapping of wormholes created in oil reservoirs. The method is also suited to other three-dimensional structures that are not easily accessible. Using the method the substructures in the three-dimensional structure may be charted. In particular, channels, i.e., a path through the structure allowing a mote to travel through the structure, e.g., from an injection to a retrieval point, may be mapped. The mapping need not be confined to mapping the relative length of channels with respect to each other, but may also include mapping the width of channels, and the like.

An embodiment of the method comprises obtaining from a simulation a set of simulated time series of sensor values, and determining a goodness of fit between a candidate-map and a three-dimensional structure by comparing the set of measured time series with the set of simulated time series.

Even though it may be possible to directly compare a candidate map to the structure, it is possible to compare simulated measurement with results from actual measurements. Comparing two sets of time series may use as intermediate a one-dimensional distribution that is computed both from the measured data and form the simulation. For one-dimensional distribution, a goodness of fit may be determined by comparing the measured distribution with the simulated distribution.

Note that it is not necessary for the motes to create a map while travelling through the structure. In an embodiment, the motes are not configured to localize themselves while traveling through the structure.

An aspect of the invention concerns a mapping system. Motes and mapping system are electronic devices.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

Thus, a method for mapping a three-dimensional structure or obtaining information on the condition of said structure is proposed. The method comprises injecting a plurality of motes into the structure causing the plurality of motes to travel through the one or more channels, the motes comprising a sensor and a storage, the motes being arranged designed to obtain a sensor-value measured by the sensor and to store the sensor-value in the storage, thus obtaining a time series of measured sensor-values in the storage, retrieving at least part of the plurality of motes from the structure, obtaining from said retrieved motes the time series of measured sensor-values stored in the retrieved motes, thus obtaining a set of measured time series, determining the structure or the condition by comparing the set of measured time series with a simulation.

BRIEF DESCRIPTION OF THE DRAWINGS

These and other aspects of the invention are apparent from and will be elucidated with reference to the embodiments described hereinafter. In the drawings.

FIGS. 5a-5c show mapping methods,

FIGS. 5d-5h show goodness of fit computation methods,

Figure 1A:
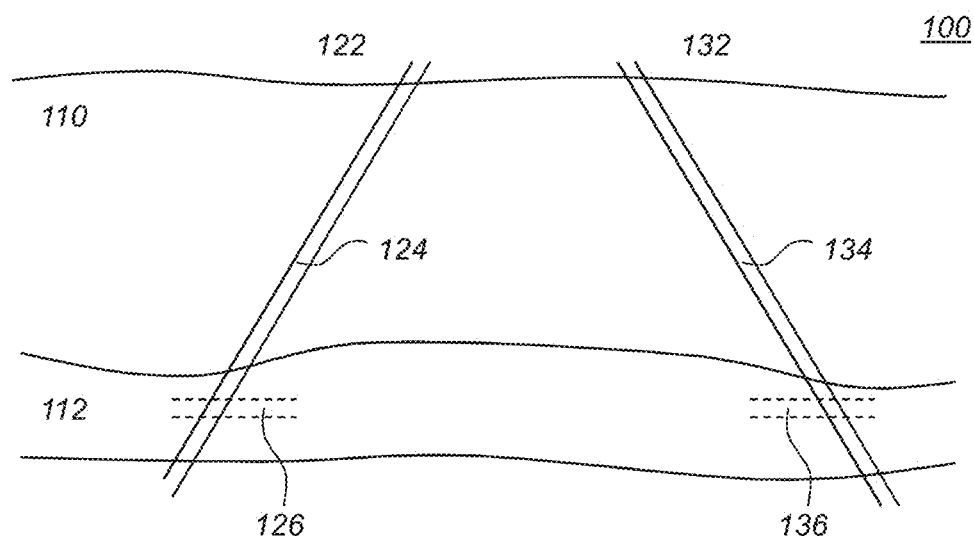
FIG. 1a is schematic cross section of a heavy oil reservoir 100.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS IN FIGS. 1a-3c 100 an oil reservoir
110 non-oil-bearing formation
112 oil-bearing formation
122 retrieval point
124 production well
126 uptake zone
132 injection point
134 injection well
136 injection zone
140 production tank
142 mote source
144 mote filter
146 mote and fluid path
300, 301, 302 a mote
310 a transceiver
310A a receiver
310B a transmitter
320 a clock
330 storage unit
340 a controller
350A, 350B a sensor unit
360 power unit

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

One application of the method of mapping a three-dimensional structure comprising one or more channels is the mapping of wormholes. The wormholes form channels in rock formations such as sandstone.

The mapping may be performed on the basis of data obtained by applying a plurality of motes, also referred to as a swarm of motes, in the structure. Interestingly, useful mapping may be performed even though the motes do not comprise localization means for determining the location of the mote, either absolute or relative to other motes in the swarm. Furthermore, although a mote will typically have wireless communication means, e.g., for reading out data stored by the mote, the mote need not be capable of wireless communication with other motes, in particular not while traveling through the three-dimensional structure.

Motes, also referred to as 'micro sensors', are autonomous sensors that comprising a sensor and a storage. The motes are arranged to, e.g., periodically, obtain a sensor-value measured by the sensor and to store the sensor-value in the storage, thus obtaining a time series of measured sensor-values in the storage.

Figure 1B:
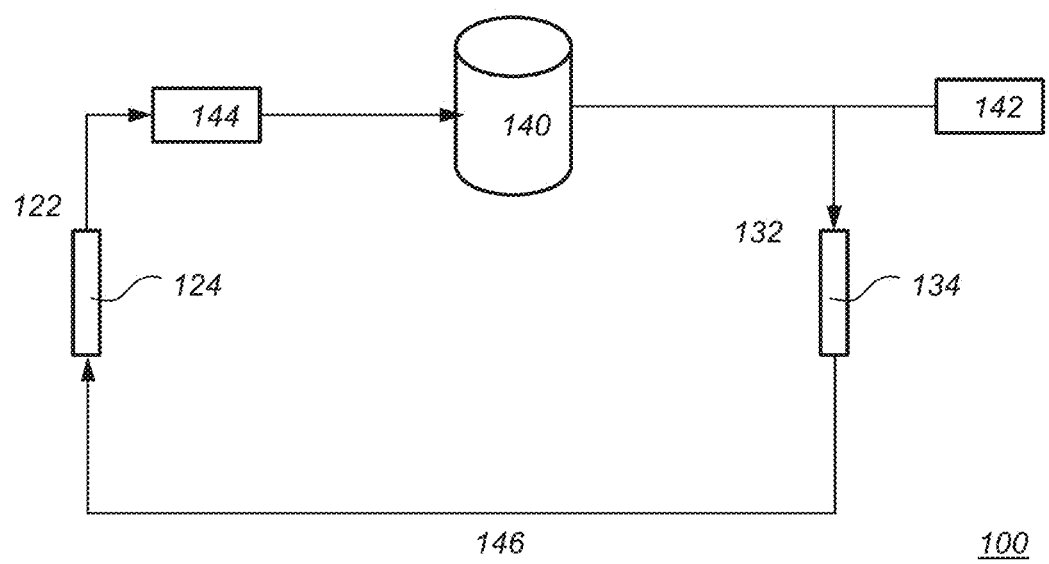
FIG. 1b is schematic block diagram of the reservoir 100 infrastructure.

With reference to FIGS. 1a, 1b and 2a one possibility for obtaining a set of measured time series is explained.

FIG. 1a is schematic cross section of an oil reservoir 100. Oil reservoir 100 comprises a non-oil-bearing formation 110 and an oil-bearing formation 112. Inside oil-bearing formation 112 channels are formed, e.g., wormholes caused by applying the CHOPS oil recovery technique. Oil-bearing formation 112 is an example of a three-dimensional structure comprising one or more channels. Note that wormholes appear on different scales; a mapping will usually be restricted to channels of a minimum scale, e.g., having a minimum diameter. For example, wormholes that are not accessible by a mote will not be mapped.

Oil reservoir 100 comprises at least two wells: production well 124 and injection well 134. Oil reservoir 100 may comprise more wells. The wells may be used for the CHOPS method. Production well 124 is used to recover oil form oil-bearing formation 112 and injection well 134 is used to inject into oil-bearing formation 112. At the surface of oil reservoir 100, production well 124 has a retrieval point 122 and injection well 134 has an injection point 132. Retrieval point 122 may be used to extract oil from oil-bearing formation 112. Thus production well 124 is a retrieval well for retrieving motes after they were injected at injection point 132, in this case from oil-bearing formation 112.

Both wells have one or more perforations to allow access to oil-bearing formation 112. In well 124 these are in an uptake zone 126 of well 124; in well 134 these are in an injection zone 136 of well 134. Uptake zone 126 and injection zone 136 may have a different size, number of perforations and perforation diameter.

For example, oil-bearing formation 112 may have a vertical thickness of 30 meters; oil-bearing formation 112 may be at a depth of 300 meter. Wells 124 and 134 may be placed at an angle, e.g. of 47 degrees. The distance between wells 124 and 124 at the depth of zones 126 and 136 may be 350 meter. These numbers are included as an example only; Oil-bearing formations are known at various depth and thicknesses, having different types of wells to which the mapping method is applicable.

FIG. 1b is a schematic block diagram of the infrastructure of an oil reservoir 100. In addition to the elements shown in FIG. 1a, FIG. 1b also shows a production tank 140. Production tank 140 may be used to store the oil and sand recovered from oil-bearing formation 112.

At injection point 132 a plurality of motes is injected into oil-bearing formation 112 from a mote source 142. Mote source 142 may be a tank or the like. The motes then travel together with the liquid through the one or more channels until they are retrieved through production well 124. FIG. 1b schematically shows the mote and fluid path 146.

Not all of the motes that are injected at injection point 132 will be retrieved at retrieval point 122. However, experiments that were performed on a heavy oil reservoir have shown that those motes can pass through oil-bearing formation 112.

At production well 124 the motes are retrieved together with sand and oil, a mote filter 144 is installed to separate the motes from the rest of the stream retrieved from injection well 134. A mote filter may be implanted as a mesh, i.e., a semi-permeable barrier made of connected strands, e.g. of metal.

Injecting the plurality of motes into the structure, e.g. into oil-bearing formation 112, may conveniently be done together with a liquid. For example, the liquid may be under pressure to force the motes into the structure. In case a liquid is used, it is advantageous to arrange the motes so that the volumetric mass density of a mote equals the volumetric mass density of the liquid. This ensures that the motes neither sink in the liquid nor rise; as a result the motes will more easily enter all parts of the structure.

Interestingly, the sensor may be an environmental temperature sensor for measuring the temperature directly outside a mote. Especially if the liquid is heated before injection, such a sensor will provide information that correlates with the structure through which the liquid passed, and accordingly, such sensor values will contain information regarding the mapping of the structure.

Temperature gradient depend on the substructure. In the case of a highly branched substructures temperature variation will be stronger. To obtain more information, the process may be repeated with liquid at different temperatures to obtain with a new swarm of motes.

Figure 2:
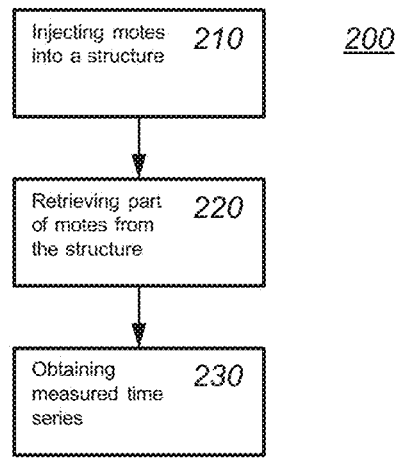
FIG. 2 is a schematic flow chart of a measuring method 200.

FIG. 2 is a schematic flow chart of a measuring method 200. The method comprises:

Injecting 210 a plurality of motes into the structure causing the plurality of motes to travel through the three-dimensional structure. For example, the injecting may use water under pressure to force the motes into the structure. The motes comprise a sensor and a storage and are arranged to obtain a time series of measured sensor-values in the storage by measuring sensor-values with the sensor and storing the sensor-values in the storage.

Retrieving 220 at least part of the plurality of motes from the structure, e.g., from an injection point.

Obtaining 230 from said retrieved motes the time series of measured sensor-values stored in the retrieved motes, thus obtaining a set of measured time series. For example, the motes may be read-out after retrieval. Read-out may be done at the retrieval point. A mote may store a mote ID, which is read-out together with the data. The mote ID is at least unique within the plurality of motes. A mote ID is not necessary.

After the motes have been retrieved, e.g., by filter 144, the time series of measured sensor-values stored in the retrieved motes are retrieved. This way a set of measured time series is obtained. Not all motes will go through the structure in the same way. Some motes will travel closer to walls of the channels than others; some motes will take different channels through the structure all together, etc. Accordingly, the time series that are obtained from the motes are not all equal, instead the distribution of the times series in the set of measured time series depends on the mapping of channels in the structure.

Figure 3A:
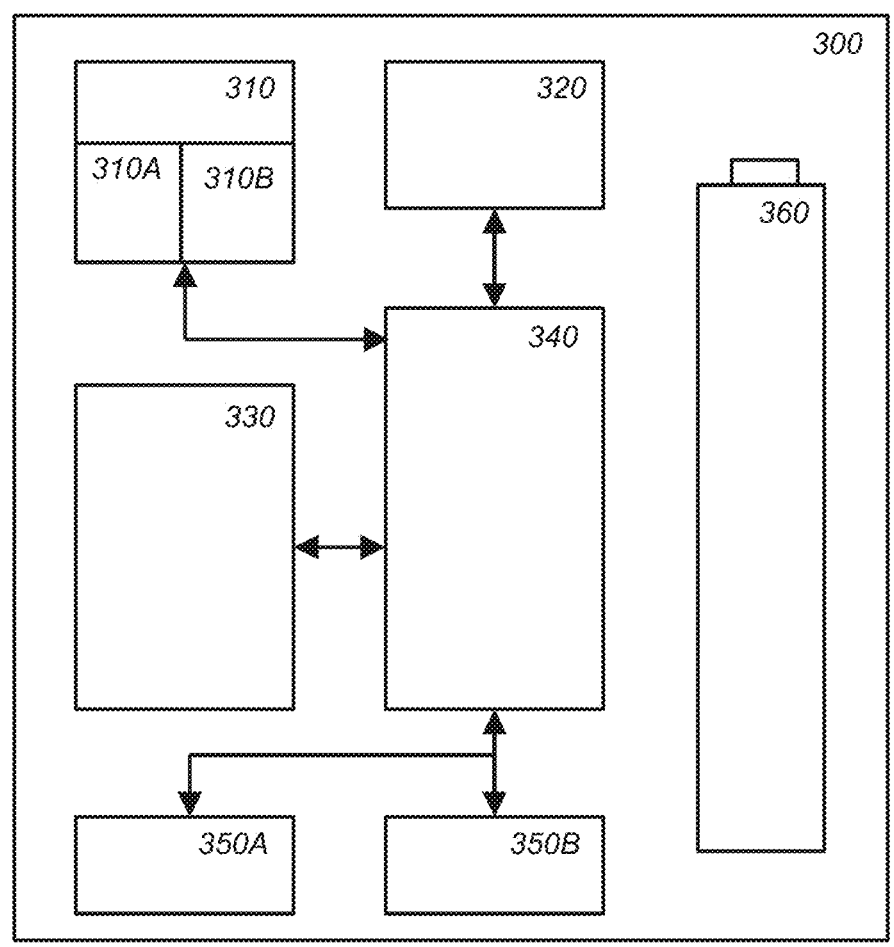
FIG. 3a is a schematic block diagram of the electronics of a mote 300.

FIG. 3a shows a schematic view of a mote 300 that may be used in a method for mapping a three-dimensional structure comprising one or more channels. FIG. 3a only shows the sensor and electronics of mote 300.

The mote 300 comprises a transceiver 310, a clock 320 and a controller 340 connected to the transceiver 310 and the clock 320 for identifying a time stamp at which a sensor value is obtained. The controller may be, e.g., a state machine or a processor. As the mote are preferably kept small, buoyant and low power, a state machine is preferred.

The transceiver 310 typically comprises a receiver 310A and a transmitter 310B. For example, transceiver 310 may be configured for wireless communication. Transceiver 310 may not work while mote 300 travels through the structure. For example, the structure may be such that wireless communication is impaired. In a typical oil-bearing formation 112, salinity is high; accordingly wireless communication will be significantly impaired. However, transceiver 310 may be used to configure mote 300 and/or retrieve a time series from mote 300.

Mote 300 includes at least one sensor unit 350A, and may have additional sensor units; one additional unit is shown: additional sensor unit 350B. The sensor units are connected to the controller 340 to provide the controller with sensed information. The sensor units 350A, 350B may, for example, comprise pressure sensors 350A, temperature sensors 350B, vibration sensors, pH sensor, magnetic field sensors. The mote 300 as schematically shown in FIG. 3 also comprises a power unit 360 such as an energy storage 360 to ensure that the mote 300 can operate during a predetermined time.

Mote 300 comprises a storage 330 for storing sensor values and/or timestamps. The storage may be a volatile or non-volatile memory. Controller 340 is configured to obtain a sensor-value measured by a sensor, and to store the sensor-value in storage 330. Preferably, the motes obtain sensor value periodically, e.g., after every elapse of a measurement period. This is not necessary though, measurement may also be performed irregularly, e.g., at random intervals.

Controller 340 is arranged to produce a time series, i.e., time index measured sensor values. This may work with a clock, as shown, and possibly storing time stamps together with the sensor values, the time stamp indicating the moment the sensor value was obtained. However, instead of time stamps, the sensor values may also be stored in order in which they were sensed. In this case the order represents the moment the sensor value was obtained. The latter option works well with periodic measurements. Instead of a clock a timer may be used to indicate when sensor values need to be taken. The period may be configurable, e.g., to 10 second, to 1 minute, to 5 minutes, and the like. Many other mote designs are possible and not further discussed herein.

All or part of the plurality of motes injected may be of the same type as mote 300. Different types of motes may however be combined. For example in an embodiment, a first part of the plurality of motes comprises a temperature sensor and a second part of the plurality of motes comprises a pressure sensor. In this way different types of information about the structure are obtained, increasing the accuracy of the goodness of fit. Mote 300 may be protected by an outer-shell arranged to withstand the forces in the structure, in particular in an oil-reservoir.

Figure 3B:
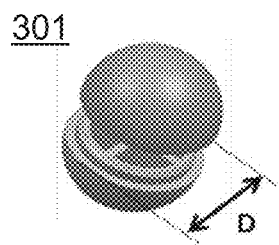
FIGS. 3b and 3c are perspective views of motes 301 and 302.
Figure 3C:
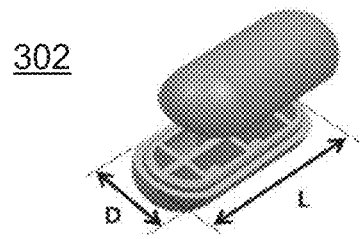

FIG. 3*b* shows a perspective view of a possible mote. The shown mote is spherical with a diameter D. The diameter may be less than or equal to 7 mm. FIG. 3*c* shows a perspective view of another possible mote. The shown mote is cylindrical with a length L and width D. The width D may be less than or equal to 7 mm. For wormholes motes are preferred with can pass through a cylinder of diameter 10 mm or larger, more preferably, of diameter 7 mm or larger. Both examples shown in FIGS. 3*b* and 3*c* satisfy this bound.

During operation a mote is configured before, e.g. turned on, before injection into the structure. After retrieval the data stored in the mote is read-out, preferably using a mobile wireless read-out device (not separately shown), which may be combined with the mote filter. After the data has been retrieved, the data is transmitted to an electronic mapping system. Such a mapping system is for example shown in FIG. 6, discussed below. Transmitting may be done over a computer network, say the Internet, but may also be done in the form of mobile computer readable storage, say a memory stick.

Obtaining a set of measured time series is explained in the context of an oil reservoir. However, the same method may be used to map other structures. This is suited for structures that are no easily accessible, say, sewer pipes, liquid distribution networks, such as water pipes, oil pipes.

A map is a digital representation of the three-dimensional structure with substructure. There are various ways in which a map may be digitally represented.

For example, the map may be a mesh discretization of the structure, e.g. of oil-bearing formation 112; dividing the domain into finite sub-regions. The sub-regions may be rectangular, but this is not necessary. The sub-regions are sometimes referred to as 'elements'. For example, a map may be a 3D-model of an area of, say, 20 meters×350 meters×350 meters. A map based on dividing a region into smaller sub-regions may be represented as an array, e.g. of 3 or more dimensions, each entry of the array corresponding to one of the elements of the 3d model. The entry in the array may represent if the corresponding element is part of a wormhole. Interestingly, the elements need not be all of the same size. For example, elements in the wormhole may be smaller than outside a wormhole.

Simpler representations of wormholes are also possible. For example, the wormholes may be represented as a series of connected line segments. The line segments may be labeled with information concerning the wormhole, e.g., its length and diameter. This representation has the advantage that fewer candidates are needed, and representation is easier. In this model the length of the line segments may be indicative of the actual length of corresponding wormhole sections. For example, the map may comprise a list of points, and a list of line segments between the points. The points in the map correspond to physical points in the three-dimensional structure. FIG. 4*d* shows a graphical representation of a connected line segment model of the wormhole of FIG. 4*c* (discussed below). The lines segments have associated information, e.g., thickness of the wormhole (not shown). Note that some channels are represented by more than one connected line segments, e.g., to indicate a change in diameter.

The map may also be represented as curves in a space, e.g., represented as splines.

Maps may be two dimensional or three dimensional. Two dimensional maps may be sufficient approximations especially for relatively thin oil-bearing structures.

Figure 4A:
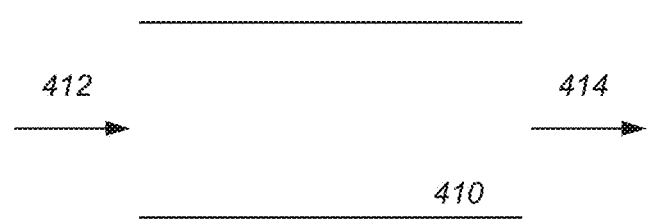
FIG. 4a-4c are schematic representation of wormholes.
Figure 4B:
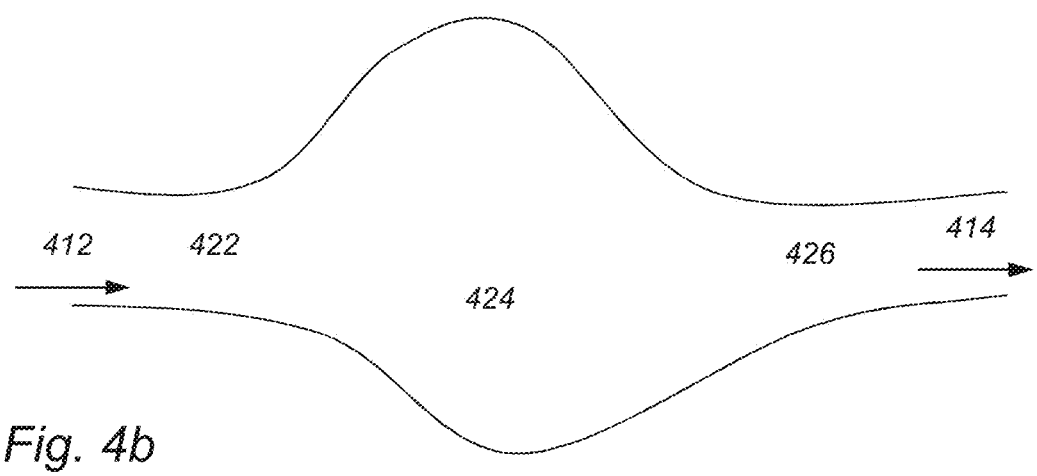
Figure 4C:
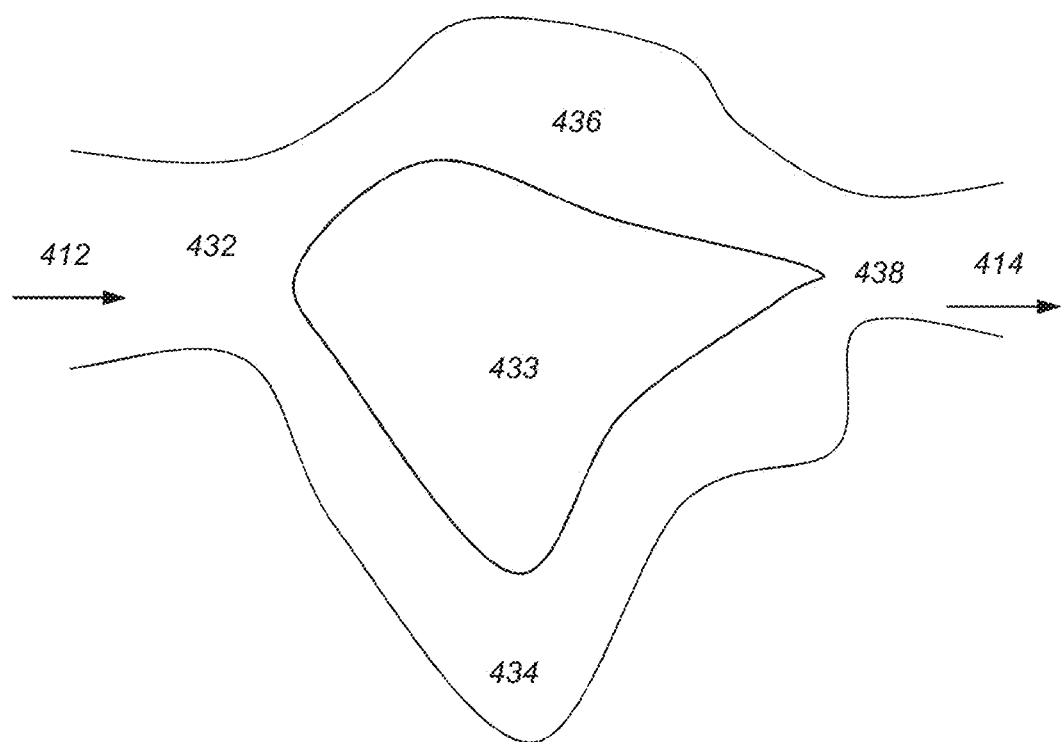
Figure 4D:
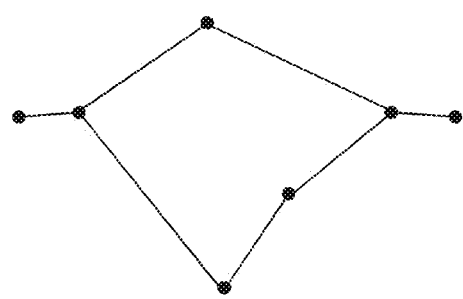
FIG. 4d is an alternative representation of the wormhole of FIG. 4c.

As an example, we present two dimensional representations of wormholes in FIGS. 4*a*, 4*b* and 4*c*. FIG. 4*a* shows a simple wormhole consisting of a single channel of constant diameter. Motes enter the channel at 412 and leave at 414. FIG. 4*b* shows a wormhole in which a channel becomes wider at 422 having a widest point at 424 and narrowing at 426. FIG. 4*c* shows a wormhole network having a channel that splits into two channels 436 and 434 at 432 to flow around a rock or salt formation 433, at 438 the two channels come together again.

The time series that will be recorded by motes that travel through these wormholes will differ because the structures that they travel through are different. Using the time series recorded in the motes a mapping of the three dimensional structure may be reconstructed.

Figure 4E:
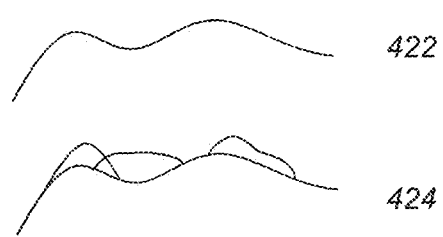
FIG. 4e shows a wormhole at two different approximation levels.

FIG. 4*e* shows two mappings 422 and 424. They represent the same structure; however they are at different levels of precision. In map 422 various channels are represented together as a single map. Nevertheless both are valid maps of the structure and may be useful for exploration of the underlying formation.

FIGS. 5*a*-5*h* show a number of ways in which a set of measured time series may be processed. These methods start from a set of measured time series that has already been obtained; For example, by injecting a plurality of motes into the structure causing the plurality of motes to travel through the one or more channels, the motes comprising a sensor and a storage, the motes being arranged to periodically obtain a sensor-value measured by the sensor and to store the sensor-value in the storage, thus obtaining a time series of measured sensor-values in the storage, retrieving at least part of the plurality of motes from the structure, and obtaining from said retrieved motes the time series of measured sensor-values stored in the retrieved motes, thus obtaining the set of measured time series. Time series may be obtained in other ways, as outlined herein or not.

It may be hard to directly determine a map of the three-dimensional structure from the set of measured time-series. It is however possible to tell for a guessed map, i.e. a candidate map, if the observed measured values are consistent with the candidate map. This can be done by simulating injecting of a plurality of virtual motes into the candidate-map. Even if the map were an accurate representation of the structure, one cannot expect any individual virtual mote to follow the exact same course as any real motes. If the map is accurate however, the measured time series will be consistent with the simulation, i.e., match the simulation. In particular, it will be the case that statistical properties of simulated time series will be the same as those of measured time series; that is if the map is sufficiently accurate. The level of consistency between map and measured time series is expressed in a goodness of fit between the candidate-map and the three-dimensional structure. The goodness of fit map be expressed as a digital value, e.g., such that a higher value corresponds with a better fit between map and simulation.

FIG. 5*a* is schematic flowchart of a method 500 for mapping a three-dimensional structure comprising one or more channels.

Given a set of measured time series and a candidate map, by determining if the measured data is consistent with the candidate map, or to what extent the measured data is consistent with the candidate map it is established if a candidate map is an accurate map. For example the set of measured time series may have been obtained using method 200. Method 500 comprises:

Selecting 510 a candidate-map for the three-dimensional structure. For example, the map may be selected from a list of standard maps. The map may be represented in one of the ways indicated above, e.g. a finite element representation or a connected line segments representation. The candidate map is suitable for digital representation is a computer memory.

Simulating 520 injecting a plurality of virtual motes into the candidate-map and the traveling of the plurality of virtual motes through one or more channels of the candidate-map. The virtual motes represent the physical motes that were injected to obtain the set of measured time series.

A number of simulators currently exist that are capable of modeling the travelling of motes through a structure, in particular through oil-bearing formation 112. The simulation may also simulate the sensor values that are obtained by the motes. In a preferred embodiment, the simulation receives as an input the temperature of the injected liquid, and the base temperature of oil-bearing formation 112.

For example, the simulator may be a simulator for heat and mass transport capable of modeling steady-state and transient hydro-geothermal reservoirs in two and/or three dimensions. The simulation may include both conductive and convective heat transport. Optionally, the simulation may also simulate groundwater flow, but this is not considered necessary.

For example, the simulation may be discretized in space and time, e.g., using a finite element method. Depending on the type of structure, e.g. of oil-bearing formation 112, the simulation may simulate flow in porous media. In advanced implementation the simulation includes pressure- and temperature-dependent fluid-phase densities and viscosities, porosity-dependent thermal conductivities, capillary-pressure—saturation relationships, and the like.

Determining 530 a goodness of fit between the candidate-map and the three-dimensional structure by comparing the set of measured time series with said simulation. Determining the goodness of fit may be done in a number ways. A number of possibilities are explained herein. A high goodness of fit between measured data and simulated data indicates that the map is likely a good representation of reality. A low goodness of fit between measured data and simulated data indicates that the map is not a good representation.

The combination of method 200 and 500, e.g., by following method 200 by method 500 is particularly suitable for mapping a structure, such as an oil reservoir. For example, method 200 and method 500 may be regarded as sub-methods of a method for mapping a three-dimensional structure.

FIG. 5b is a schematic flow chart of a method 501 that shows a way to use goodness of fit data. After the goodness of fit has been calculated, the goodness of fit is compared with a goodness of fit threshold. If the goodness of fit is below the threshold, the method returns to the phase in which a candidate map is selected. In this way candidate maps are selected until a good map has been found, that provides for a sufficiently strong goodness of fit. Selecting a new candidate map may be depended on one or more previous maps. For example, the candidate map may be optimized, e.g., using simulated annealing, hill climbing, genetic algorithms and the like.

FIG. 5c is a schematic flow chart of a method 502 that shows a way to use goodness of fit data. The flowchart comprises Selecting 512 multiple candidate-maps for the three-dimensional structure. For example, the candidate maps may be taken from a list of standard maps.

Determining 514 a goodness of fit between each of the multiple candidate-maps and the three-dimensional structure.

Selecting 542 the candidate-maps from the multiple candidate-maps having a highest goodness of fit. Instead of selecting the highest ranking map, the method may continue with method 501, by selecting a new map in dependence on the maps already tried on the list, e.g., by making iterative modifications to the candidate maps with a high goodness of fit score, e.g., the highest so far.

The threshold may be experimentally established, e.g., by determining at what point it is no longer computationally feasible to find improved maps, and may be experimentally validated, e.g., by verifying a candidate map through drilling a new well.

FIG. 5d is a schematic flowchart of a possible embodiment for determining a goodness of fit, in phase 530 of a mapping method, e.g., methods 500, 501 and 502. The flowchart comprises Comparing 551 the set of measured time series with said simulation.

There are many ways in which the simulation results may be compared with measured data. Generally speaking the comparison verifies whether the sensor data that would be expected given a certain candidate map is consistent with the data that was actually measured. An interesting aspect of this approach, is that it is not required that one knows how to reconstruct a map from, say, temperature measurements directly; instead one arrives at a good estimate for the map indirectly.

In general, one way to obtain a goodness of fit is as follows:

Compute a one-dimensional distribution from the set of measured data

Obtain a one-dimensional simulated distribution from the simulation.

Determining a goodness of fit comprises comparing the measured distribution with the simulated distribution.

The measured and simulated distribution may be chosen so that if the map is a more accurate representation of the three-dimensional structure, the distributions are closer to each other. Goodness of fit can be represented by a distance function between the simulated and measured distribution. The distance function may, e.g., be a Euclidian distance, a correlation, a statistical test that represents the likelihood that two distributions are the same, etc.

A number of embodiments for comparing the set of measured time series with the simulation are given below.

FIG. 5e is a schematic flowchart of a possible embodiment for determining a goodness of fit, in phase 530 of a mapping method, e.g., methods 500, 501 and 502. The method comprises Determining 552 for measured time series in the set of measured time series a set of passage-times, a passage-time indicating the time duration between injection of the mote corresponding to the measured time series and retrieval of said mote, and determining 553 a measured passage-time distribution for the retrieved motes.

For most sensor values it is apparent from the time series when a mote emerges from a well; this may be recognized from a sensor value shift. For example a temperature shift will be visible for temperature values, a pressure drop for pressure values. The sensor shift that signals the moment a mote exits the well, may be obtained from simulation, e.g., simulated time series (explained below).

Figure 5I:
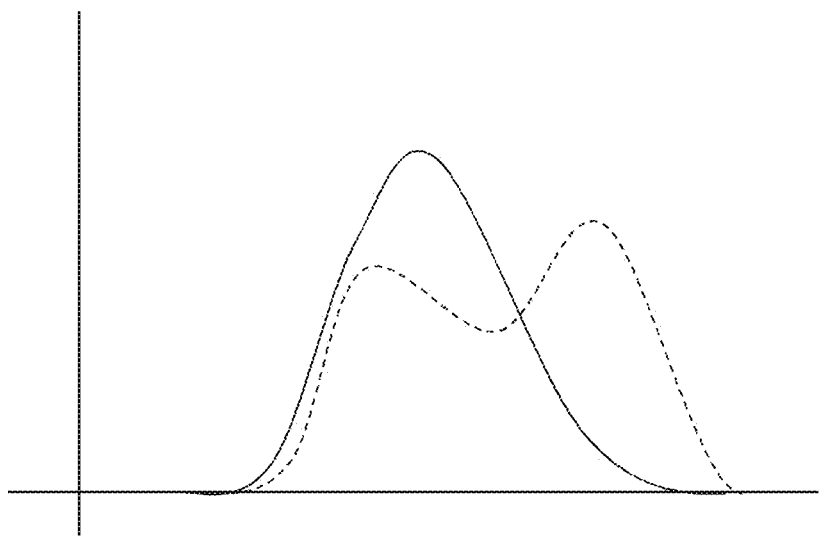
FIG. 5i shows two passage time distributions.

Obtaining 554 a simulated passage-time distribution from the simulation. The distribution is indicative of the proportion of motes that spent a particular amount of time in the structure. Comparing FIG. 4*a* or 4*b* with FIG. 4*c*, then in the first two figures one would expect a normal distribution for the passage time distribution but in the latter figure a distribution with two peaks. FIG. 5*i* is an illustration of this phenomenon. Horizontal axis represents passage time; Vertical axis represents portion of motes with a certain passage time. Distribution may be discrete or continuous. Said portion representation may be a probability density function. Distribution estimation algorithms from limited data may be used to estimate the distribution, e.g., filtering, smoothing etc. The dotted line represents FIG. 4*c*, the un-dotted line represents FIG. 4*a* or 4*b*. FIG. 5*i* is for illustration only and is not based on simulated data.

Comparing 555 the measured passage-time distribution with the simulated passage-time distribution.

FIG. 5*f* is a schematic flowchart of a possible embodiment for determining a goodness of fit, in phase 530 of a mapping method, e.g., methods 500, 501 and 502. The method comprises Obtaining 556 from said simulation a set of simulated time series of sensor values. For example, the simulation may simulate the virtual motes traveling through the structure and record a time series for each simulated virtual mote.

Comparing 570 the set of measured time series with the set of simulated time series. Through this approach two sets of data are obtained that can be directly compared. For example a distance function between two set of times series may be employed. For example, one may derive one or more one-dimensional distributions and compared these with each other. The distance between the sets may be derived from the distances between the distributions, e.g., the maximum distance, the average distance, and the like.

For example, one may obtain passage time both from simulated and measured time series. Sometimes, as in this case, the distribution may also be directly obtained from the simulation and need not use simulated time series as intermediate data. Below other examples are given.

FIG. 5*g* is a schematic flowchart of a possible embodiment for determining a goodness of fit, in phase 570 of a mapping method, e.g., method 553. The method comprises Assigning 581 the time series in the set of simulated time series and in the set of measured time series to one of multiple of distinct categories, for each category, counting 582 the number of time series from the set of simulated time series assigned to the category and counting the number of time series from the set of measured time series assigned to the category, Comparing the numbers of assigned simulated time series to the numbers of assigned measured time series.

This method gives a discrete distribution over the categories, discrete distance functions may be used, e.g., Euclidian distance, statistical tests, and the like. Many possible choices exist for the categories. For example, the categories may be the number of local maxima and/or local minima. This measures correlates with crossings in the network.

FIG. 5*h* is a schematic flowchart of a possible embodiment for determining a goodness of fit. The method may be used in all of the above methods. The method comprises Determining 584 a histogram for the time series in the set of simulated time series and in the set of measured time series. Computing histograms suppresses variability in the data, and may be used in all the above methods. If the number possible histograms is small enough, they can be regarded as categories and the method of FIG. 5*g* may be used. For example, one may:

Determine 585 simulated and measured histogram distributions, and

Compare 586 the simulated and measured histogram distributions

The approach is also applicable to obtain information on the condition of the structure. For example, an embodiment comprises: selecting a candidate sensor-parameter, simulating a candidate sensor-parameter in the structure and determining the condition based on a goodness of fit between the candidate-map and the three-dimensional structure by comparing the set of measured time series with said simulation. Examples of sensor-parameter include temperature and pressure in the structure. These parameters are important for reservoir operator to know.

It is considered that a method for obtaining information on the condition of a three-dimensional structure comprising one or more channels has independent merit; the method comprising injecting a plurality of motes into the structure causing the plurality of motes to travel through the one or more channels, the motes comprising a sensor and a storage, the motes being arranged to obtain a sensor-value measured by the sensor and to store the sensor-value in the storage, thus obtaining a time series of measured sensor-values in the storage, retrieving at least part of the plurality of motes from the structure obtaining from said retrieved motes the time series of measured sensor-values stored in the retrieved motes, thus obtaining a set of measured time series, selecting a candidate sensor-parameter for the three-dimensional structure, simulating the candidate sensor-parameter in the structure, injecting a plurality of virtual motes into the candidate-map and the traveling of the plurality of virtual motes through one or more channels of the candidate-map, determining the condition based on a goodness of fit between the candidate-map and the three-dimensional structure by comparing the set of measured time series with said simulation.

Many different ways of executing the methods are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

The methods may be executed in a distributed fashion. For example, the retrieved motes may be read-out on locations, after which the data is sent to a mapping system 600. Independent, e.g., parallel, from reading out, one or more candidate maps may be established. Simulating the one or more maps may be conveniently use parallel processor architectures.

A method according to the invention may be executed using software, which comprises instructions for causing a processor system to perform methods of FIGS. 5*a*-5*h*. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform a method according to the invention.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6:
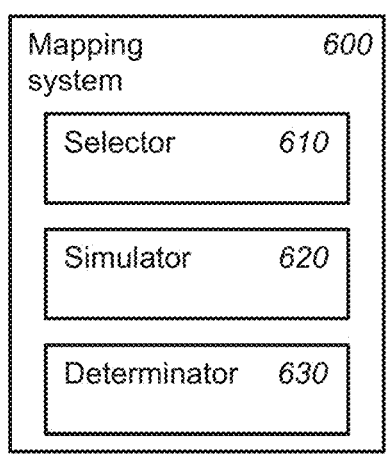
FIG. 6 shows a mapping system

FIG. 6 illustrates with schematic block diagram an electronic mapping system 600 for mapping a three-dimensional structure comprising one or more channels. The device may implement any of the methods disclosed herein. Mapping system 600 comprises a selector 610 arranged to select a candidate-map for the three-dimensional structure, a simulator 620 arranged to simulate injecting a plurality of virtual motes into the candidate-map and the traveling of the plurality of virtual motes through one or more channels of the candidate-map and a determinator 630 arranged to determining a goodness of fit between the candidate-map and the three-dimensional structure by comparing a set of measured time series with said simulation. Selector 610 may be a selector circuit; Simulator 620 may be a simulator circuit; Determinator 630 may be a determinator circuit arranged to determining a goodness of fit between the candidate-map and the three-dimensional structure by comparing a set of measured time series with said simulation. The circuits may be a processor circuit and storage circuit, the processor circuit executing instructions represented electronically in the storage circuits. The circuits may also be, FPGA, ASIC or the like.

Mapping system 600 may be a single integrated device, or distributed, e.g. over multiple locations.

The mapping methods disclosed herein may be implemented in a computer program for mapping a three-dimensional structure. The computer program may comprise multiple sub-programs, possibly designed to run on different computers.

The selector or selector circuit may be configured to select a candidate sensor-parameter, the simulator or simulator circuit to simulating a candidate sensor-parameter in the structure, and the determinator or determinator circuit for determining the condition based on a goodness of fit between the candidate-map and the three-dimensional structure by comparing the set of measured time series with said simulation. In this way information on the condition of the structure is obtained.

Figure 7A:
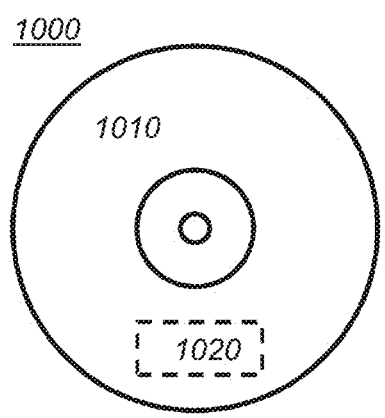
FIG. 7a shows a computer readable medium

FIG. 7a shows a computer readable medium 1000 having a writable part 1010 comprising a computer program 1020, the computer program 1020 comprising instructions for causing a processor system to perform a method of mapping a three-dimensional structure comprising one or more channels comprising selecting a candidate-map for the three-dimensional structure, simulating injecting a plurality of virtual motes into the candidate-map and the traveling of the plurality of virtual motes through one or more channels of the candidate-map, and determining a goodness of fit between the candidate-map and the three-dimensional structure by comparing a set of measured time series with said simulation, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown in FIG. 7a as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of mapping a three-dimensional structure.

Figure 7B:
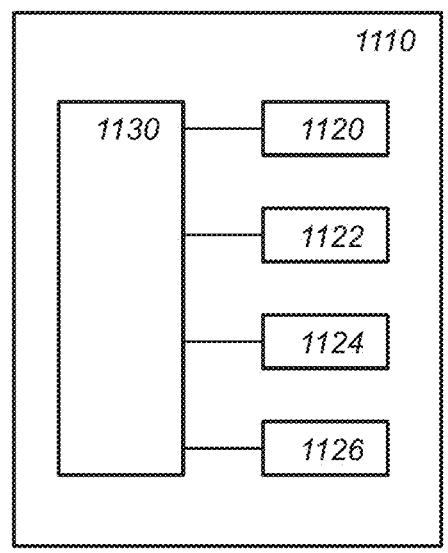
FIG. 7b shows a processor system

FIG. 7b shows in top-view a schematic representation of a processor system 1100 according to the invention. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to the invention and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

Computer program 1020 and/or processor system 1110 may be configured to analyze measured data in combination with one or more candidate maps to map the three-dimensional structure.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for mapping a three-dimensional structure, the method comprising:

injecting a plurality of motes into the structure causing the plurality of motes to travel through the three-dimensional structure, the motes comprising a sensor and a storage, the motes being arranged to obtain a time series of measured sensor-values in the structure by measuring sensor-values with the sensor and storing the sensor-values in the storage, thus, retrieving at least part of the plurality of motes from the structure, obtaining from said retrieved motes the time series of measured sensor-values stored in the retrieved motes, thus obtaining a set of measured time series, selecting a candidate-map for the three-dimensional structure, simulating injecting a plurality of virtual motes into the candidate-map and the traveling of the plurality of virtual motes through the candidate-map, obtaining from said simulation a set of simulated time series, the set of simulated time series including a time series of sensor values for each virtual mote, and determining a goodness of fit between the candidate-map and the three-dimensional structure by matching the set of measured time series with the set of simulated time series.

2. A method as in claim 1, comprising:
determining for measured time series in the set of measured time series a set of passage-times, a passage-time indicating the time duration between injection of the mote corresponding to the measured time series and retrieval of said mote, determining a measured passage-time distribution for the retrieved motes, obtaining a simulated passage-time distribution from the simulation, wherein determining a goodness of fit comprises comparing the measured passage-time distribution with the simulated passage-time distribution.

3. A method as in claim 1, wherein determining a goodness of fit between the candidate-map and the three-dimensional structure comprises comparing the set of measured time series with the set of simulated time series.

4. A method as in claim 1, comprising:
assigning the time series in the set of simulated time series and in the set of measured time series to one of multiple of distinct categories, each category, counting the number of time series from the set of simulated time series assigned to the category and counting the number of time series from the set of measured time series assigned to the category, wherein determining a goodness of fit comprises comparing the numbers of assigned simulated time series to the numbers of assigned measured time series.

5. A method as in claim 1, comprising determining a histogram for the time series in the set of simulated time series and in the set of measured time series.

6. A method as in claim 1, comprising:
selecting multiple candidate-maps for the three-dimensional structure, determining a goodness of fit between each of the multiple candidate-maps and the three-dimensional structure, and selecting the candidate-maps from the multiple candidate-maps having a highest goodness of fit.

7. A method as in claim 1, wherein the sensor is an environmental temperature sensor.

8. A method as in claim 1, wherein the plurality of motes are injected into the structure together with a liquid.

9. A method as in claim 8, wherein the volumetric mass density of the motes equals the volumetric mass density of the liquid.

10. A method as in claim 8, wherein the liquid is heated before the injection.

11. A method as in claim 1, further arranged to determine information on a condition of the structure, comprising:
selecting a candidate sensor-parameter,
simulating the candidate sensor-parameter in the structure, and
determining the information on the condition based on a goodness of fit between the candidate-map and the three-dimensional structure by comparing the set of measured time series with the set of simulated time series.

12. A method as in claim 1, wherein the three-dimensional structure is underground, the motes are injected through an injection well and retrieved through a retrieval well.

13. A mapping system for mapping a three-dimensional structure, the system comprising:
a selector arranged to select a candidate-map for the three-dimensional structure,
a simulator arranged to simulate injecting a plurality of virtual motes into the candidate-map and the traveling of the plurality of virtual motes through the candidate-map, and obtain from said simulation a set of simulated time series, the set of simulated time series including a time series of sensor values for each virtual mote, and
a determinator arranged to determining a goodness of fit between the candidate-map and the three-dimensional structure by matching a set of measured time series with the set of simulated time series.

14. A method for mapping a three-dimensional structure comprising:
selecting a candidate-map for the three-dimensional structure,
simulating injecting a plurality of virtual motes into the candidate-map and the traveling of the plurality of virtual motes through the candidate-map,
obtaining from said simulation a set of simulated time series, the set of simulated time series including a time series of sensor values for each virtual mote,
determining a goodness of fit between the candidate-map and the three-dimensional structure by matching a set of measured time series with the set of simulated time series.

15. A non-transitory computer-readable medium containing computer instructions stored therein for causing a computer processor to perform the method of claim 14.

16. A mapping system for mapping a three-dimensional structure, the system comprising:
a selector circuit arranged to select a candidate-map for the three-dimensional structure,
a simulator circuit arranged to simulate injecting a plurality of virtual motes into the candidate-map and the traveling of the plurality of virtual motes through the candidate-map, and obtain from said simulation a set of simulated time series, the set of simulated time series including a time series of sensor values for each virtual mote, and
a determinator circuit arranged to determining a goodness of fit between the candidate-map and the three-dimensional structure by matching a set of measured time series with the set of simulated time series.

* * * * *